United States Patent
Lee et al.

(10) Patent No.: US 12,430,421 B2
(45) Date of Patent: Sep. 30, 2025

(54) APPARATUS AND METHOD FOR UPDATING INTERNET-BASED MALWARE DETECTION ENGINE USING SCALING CONTROL OF VIRTUAL MACHINE

(71) Applicant: ELECTRONICS AND TELECOMMUNICATIONS RESEARCH INSTITUTE, Daejeon (KR)

(72) Inventors: Sang-Min Lee, Daejeon (KR); Ki-Jong Koo, Daejeon (KR); Jung-Tae Kim, Daejeon (KR); Ji-Hyeon Song, Daejeon (KR); Jong-Hyun Kim, Daejeon (KR); Dae-Sung Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 204 days.

(21) Appl. No.: 18/335,813

(22) Filed: Jun. 15, 2023

(65) Prior Publication Data
US 2024/0104195 A1    Mar. 28, 2024

(30) Foreign Application Priority Data
Sep. 28, 2022    (KR) ........................ 10-2022-0123255

(51) Int. Cl.
*G06F 21/53*    (2013.01)
*G06F 9/455*    (2018.01)
*G06F 21/56*    (2013.01)

(52) U.S. Cl.
CPC .......... *G06F 21/53* (2013.01); *G06F 9/45558* (2013.01); *G06F 21/564* (2013.01); *G06F 2009/45562* (2013.01)

(58) Field of Classification Search
CPC ..... G06F 21/53; G06F 21/564; G06F 9/45558
See application file for complete search history.

(56) References Cited

U.S. PATENT DOCUMENTS

| | | | |
|---|---|---|---|
| 9,460,284 B1 | 10/2016 | Hajmasan et al. | |
| 2020/0125728 A1* | 4/2020 | Savir | G06F 21/554 |
| 2022/0035905 A1* | 2/2022 | Lu | G06F 21/56 |

FOREIGN PATENT DOCUMENTS

| | | |
|---|---|---|
| KR | 20150137597 A | 12/2015 |
| KR | 20180000204 A | 1/2018 |
| KR | 10-2020-0057402 A | 5/2020 |
| KR | 10-2021-0092462 A | 7/2021 |
| KR | 20210112930 A | 9/2021 |

* cited by examiner

*Primary Examiner* — Clayton R Williams
(74) *Attorney, Agent, or Firm* — Rabin & Berdo, P.C.

(57) ABSTRACT

Disclosed herein are an apparatus and method for updating an Internet-based malware detection engine using virtual machine scaling. The method may include creating a scaling group and an update group set based on a first virtual machine image, creating a second virtual machine image for a running virtual machine in response to occurrence of a snapshot event in the virtual update group run based on the first virtual machine image, modifying the scale-out image of the scaling group to the second virtual machine image, updating the scaling group by triggering a scale-out event and a scale-in event in the scaling group in response to occurrence of an update event, and modifying the scale-in image of the scaling group to the second virtual machine image.

20 Claims, 7 Drawing Sheets

APPARATUS AND METHOD FOR UPDATING INTERNET-BASED MALWARE DETECTION ENGINE USING SCALING CONTROL OF VIRTUAL MACHINE

CROSS REFERENCE TO RELATED APPLICATION

This application claims the benefit of Korean Patent Application No. 10-2022-0123255, filed Sep. 28, 2022, which is hereby incorporated by reference in its entirety into this application.

BACKGROUND OF THE INVENTION

1. Technical Field

The disclosed embodiment relates generally to Internet-based malware detection technology for detecting malware by installing a malware detection engine in a virtual machine, and more particularly to technology for updating a malware detection engine installed in a virtual machine.

2. Description of the Related Art

General malware detection technology uses a method of analyzing whether a file suspected of malware has characteristics of malware using a malware detection program installed in the terminal of a user. Recently, an Internet-based malware detection system, which detects malware using a malware detection engine installed in an Internet server, has emerged.

A general method for installing a malware detection engine on the Internet is to use a virtual machine (VM). Accordingly, the computing resources of an Internet server may be efficiently used.

That is, in order to provide an optimal service, as many virtual machines as are supportable are installed and used by repeating an operation of increasing the number of virtual machines for malware detection engines through scale-out in response to an increase in the demand for malware detection and an operation of decreasing the number of virtual machines through scale-in in response to a decrease in the demand for malware detection, whereby the resource efficiency of an Internet server may be improved.

Meanwhile, the malware detection engine is required to reflect updated malware information. General commercial products have to update malware patterns in a periodic or aperiodic manner, and a malware detection engine based on Artificial Intelligence (AI) has to be updated whenever a training result is changed. However, because the operation of the malware detection function should not be interrupted even when the update is in progress, a measure to respond this is required.

SUMMARY OF THE INVENTION

An object of the disclosed embodiment is to maintain the operation of a malware detection engine without interruption while updated malware information is reflected.

A method for updating an Internet-based malware detection engine using virtual machine scaling according to an embodiment may include creating a scaling group and an update group set based on a first virtual machine image, creating a second virtual machine image for a running virtual machine in response to occurrence of a snapshot event in the virtual update group run based on the first virtual machine image, modifying a scale-out image of the scaling group to the second virtual machine image, updating the scaling group by triggering a scale-out event and a scale-in event in the scaling group in response to occurrence of an update event, and modifying a scale-in image of the scaling group to the second virtual machine image.

Here, the scaling group may include an initial virtual machine image, the scale-out image, the scale-in image, scale-out event information, and scale-in event information.

Here, the update group may include a virtual machine image, a snapshot event, and an update event.

Here, the method for updating an Internet-based malware detection engine using virtual machine scaling according to an embodiment may further include checking the scaling group in response to occurrence of the scale-out event, adding a virtual machine using the scale-out image set in the corresponding scaling group, and updating scale-out event information.

Here, the method for updating an Internet-based malware detection engine using virtual machine scaling according to an embodiment may further include checking the scaling group in response to occurrence of the scale-in event, deleting a virtual machine of the scale-in image set in the corresponding scaling group, and updating scale-in event information.

Here, updating the scaling group may include adding a virtual machine using the second virtual machine image in the scaling group in response to occurrence of the scale-out event and deleting a virtual machine of the first virtual machine image of the scaling group in response to occurrence of the scale-in event.

Here, when updating the scaling group, the scale-out event and the scale-in event may be repeatedly triggered until all of virtual machines of the first virtual machine image are deleted.

An apparatus for updating an Internet-based malware detection engine using virtual machine scaling according to an embodiment includes memory in which at least one program is recorded and a processor for executing the program. The program may perform creating a scaling group and an update group set based on a first virtual machine image, creating a second virtual machine image for a running virtual machine in response to occurrence of a snapshot event in the virtual update group run based on the first virtual machine image, modifying a scale-out image of the scaling group to the second virtual machine image, updating the scaling group by triggering a scale-out event and a scale-in event in the scaling group in response to occurrence of an update event, and modifying a scale-in image of the scaling group to the second virtual machine image.

Here, the scaling group may include an initial virtual machine image, the scale-out image, the scale-in image, scale-out event information, and scale-in event information.

Here, the update group may include a virtual machine image, a snapshot event, and an update event.

Here, the program may further perform checking the scaling group in response to occurrence of the scale-out event, adding a virtual machine using the scale-out image set in the corresponding scaling group, and updating scale-out event information.

Here, the program may further perform checking the scaling group in response to occurrence of the scale-in event, deleting a virtual machine created using the scale-in image set in the corresponding scaling group, and updating scale-in event information.

Here, when updating the scaling group, the program may perform adding a virtual machine using the second virtual machine image in the scaling group in response to occurrence of the scale-out event and deleting a virtual machine created using the first virtual machine image of the scaling group in response to occurrence of the scale-in event.

Here, when updating the scaling group, the program may repeatedly trigger the scale-out event and the scale-in event until all of virtual machines created using the first virtual machine image are deleted.

An apparatus for updating an Internet-based malware detection engine using virtual machine scaling according to an embodiment includes memory in which at least one program is recorded and a processor for executing the program. The program may create a scaling group and an update group set based on a first virtual machine image and perform at least one of scale-out, scale-in, a snapshot, or an update, or a combination thereof corresponding to an event based on the created scaling group and update group in response to occurrence of the event, the scaling group may include an initial virtual machine image, a scale-out image, a scale-in image, scale-out event information, and scale-in event information, and the update group may include a virtual machine image, a snapshot event, and an update event.

Here, the program may perform checking the scaling group in response to occurrence of a scale-out event, adding a virtual machine using the scale-out image set in the corresponding scaling group, and updating the scale-out event information.

Here, the program may perform checking the scaling group in response to occurrence of a scale-in event, deleting a virtual machine created using the scale-in image set in the corresponding scaling group, and updating the scale-in event information.

Here, the program may perform creating a second virtual machine image for a running virtual machine in response to occurrence of the snapshot event in the virtual update group run based on the first virtual machine image and modifying the scale-out image of the scaling group to the second virtual machine image.

Here, the program may perform repeatedly triggering a scale-out event and a scale-in event in the scaling group in response to occurrence of the update event and modifying the scale-in image of the scaling group to the second virtual machine image when all of virtual machines created from the first virtual machine image of the scaling group are deleted.

Here, the program may add a virtual machine using the second virtual machine image in the scaling group in response to occurrence of the scale-out event and delete a virtual machine created using the first virtual machine image of the scaling group in response to occurrence of the scale-in event.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
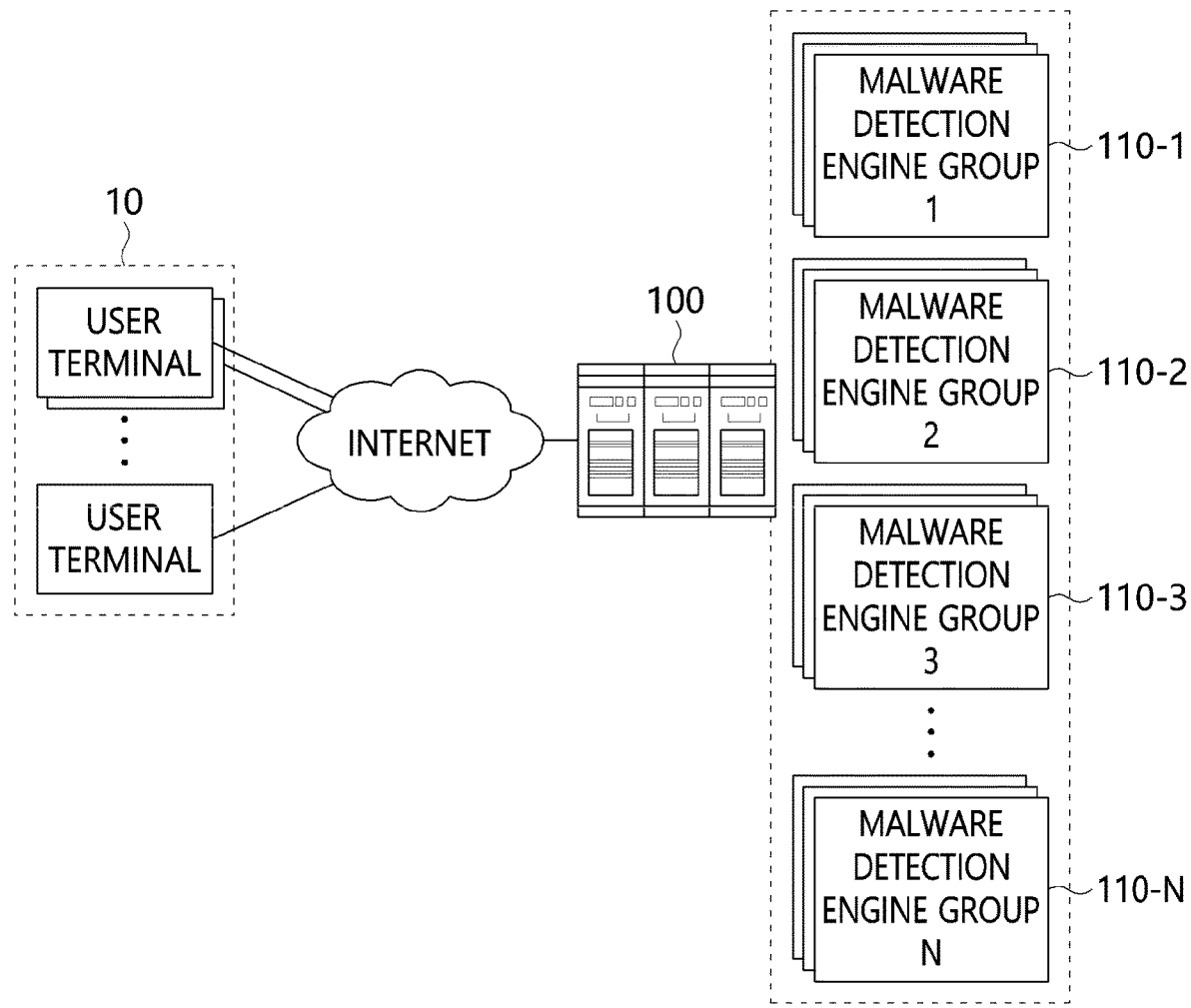
FIG. 1 is a block diagram of a system for detecting malware based on an Internet according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for updating an Internet-based malware detection engine using virtual machine scaling according to an embodiment will be described in detail with reference to FIGS. 1 to 12.

FIG. 1 is a block diagram of a system for detecting malware based on an Internet according to an embodiment.

Referring to FIG. 1, the system for detecting malware based on an Internet according to an embodiment may be configured such that at least one terminal 10, which requests checking for malware, interworks with a malware detection server 100, which checks for malware, over the Internet.

The terminal 10 requests the malware detection server 100 to check a target file through the Internet and receives a check result from the malware detection server 100, thereby determining whether the corresponding file is malware.

The malware detection server 100 may use a physical server or a virtual machine (VM) based on a cloud. That is, in order to provide a convenient user environment and to immediately respond to a request of a user, a virtual-machine-based malware detection engine to which cloud technology is applied according to an embodiment may be used.

In an embodiment, a description is made on the assumption that only a single malware detection engine is installed in a single virtual machine server. However, this installation method is merely an embodiment for helping understanding of a description, and the present disclosure is not limited thereto. That is, multiple malware detection engines may be installed in a single virtual machine according to the present disclosure.

Also, a malware detection engine is classified depending on the type, and virtual machines in which the same type of malware detection engines are installed are referred to as a malware detection engine group.

That is, referring to FIG. 1, n malware detection engine groups 110-1, 110-2, 110-3, . . . , 110-n are present in the malware detection server 100, and each of the malware detection engine groups 110-1, 110-2, 110-3, . . . , 110-n includes virtual machine (VM) servers in which the same kind of malware detection engines are installed.

A general Internet-based malware detection system detects malware through the step of checking a previous detection history by transferring only information including a hash value of a file, and the like for convenience of use and the step of detecting malware by transferring the actual file.

Figure 2:
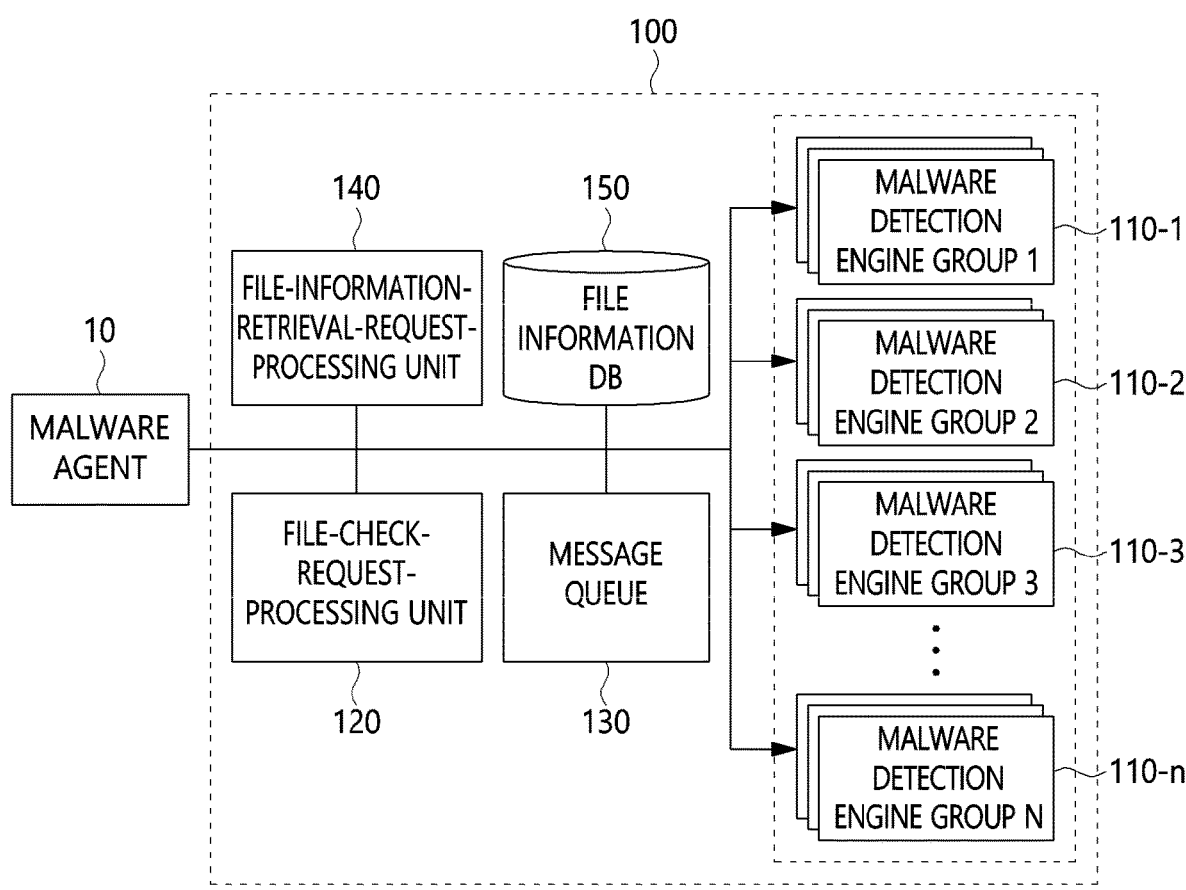
FIG. 2 is a schematic internal block diagram of a server for detecting malware based on an Internet according to an embodiment.

FIG. 2 is a schematic internal block diagram of an Internet-based malware detection server according to an embodiment.

Referring to FIG. 2, the Internet-based malware detection server 100 according to an embodiment may include malware detection engine groups 110-1, 110-2, 110-3, . . . , 110-n, a file-check-request-processing unit 120, a message queue 130, a file-information-retrieval-request-processing unit 140, and a file information DB 150.

The file-check-request-processing unit 120 receives a file, for which malware detection is requested, and sequentially the same in the message queue 130. A request to check each of the files stored in the message queue 130 is made to a corresponding one of the malware detection engine groups 110-1, 110-2, 110-3, . . . , 110-n according to a set sequence.

Here, because the malware detection engine groups 110-1, 110-2, 110-3, . . . , 110-n have different malware detection performance capabilities, the message queue 130 is also separated to correspond to the respective malware detection engine groups 110-1, 110-2, 110-3, . . . , 110-n.

The message queue 130 may be physically or logically separated.

Each of the malware detection engine groups 110-1, 110-2, 110-3, . . . , 110-n is configured with one or more identical virtual machines and is required to automatically adjust the number of virtual machines in response to increasing or decreasing demand for malware detection.

Here, the process of increasing the number of virtual machines is called scale-out and the process of decreasing the number of virtual machines is called scale-in.

Also, auto-scaling means the process of automatically performing scale-out and scale-in. Here, multiple virtual machine groups on which scale-in and scale-out are to be performed may be present when auto-scaling is performed, and the multiple virtual machine groups may individually perform scale-in and scale-out.

Here, in the case of scale-out, information about an image to be used when the number of virtual machines is increased is set, and when the number of virtual machines is increased, the multiple running virtual machines created using the same image constitute a group. The virtual machine group configured as described above may be the target for which actual resource monitoring is to be performed.

Meanwhile, in the process of updating a virtual machine, it may be impossible to identify an update target using only the information of a running virtual machine created using a specific image.

For example, when it is assumed that update is performed every day, a snapshot image created from a virtual machine of the same image is stored under a different name in order to differentiate the same from a previous snapshot image. That is, the snapshot images of the same virtual machine may be created to have different names according to the creation date.

Accordingly, if a different image is used whenever an update virtual machine is created, it is necessary not only to differentiate a snapshot image created from the same virtual machine from that created from a different virtual machine but also to identify each of the snapshot images created from the same virtual machine.

Generally, a newly created image performs the same function by substituting the used image. However, virtual machines created from the new image are also required to perform scale-in and scale-out according to the same scaling policy. To this end, an embodiment proposes a method for updating an Internet-based malware detection engine using virtual machine scaling that is capable of grouping the newly created image and the previous image as the same scaling group.

The method for updating an Internet-based malware detection engine using virtual machine scaling according to an embodiment employs a method for controlling virtual machine scaling in order to smoothly perform an update function while maintaining the operation of a malware detection engine in the above-described Internet-based malware detection system using the malware detection engine in the form of virtual machine.

Accordingly, a general method for controlling virtual machine scaling applied in the embodiment will be described first.

Figure 3:
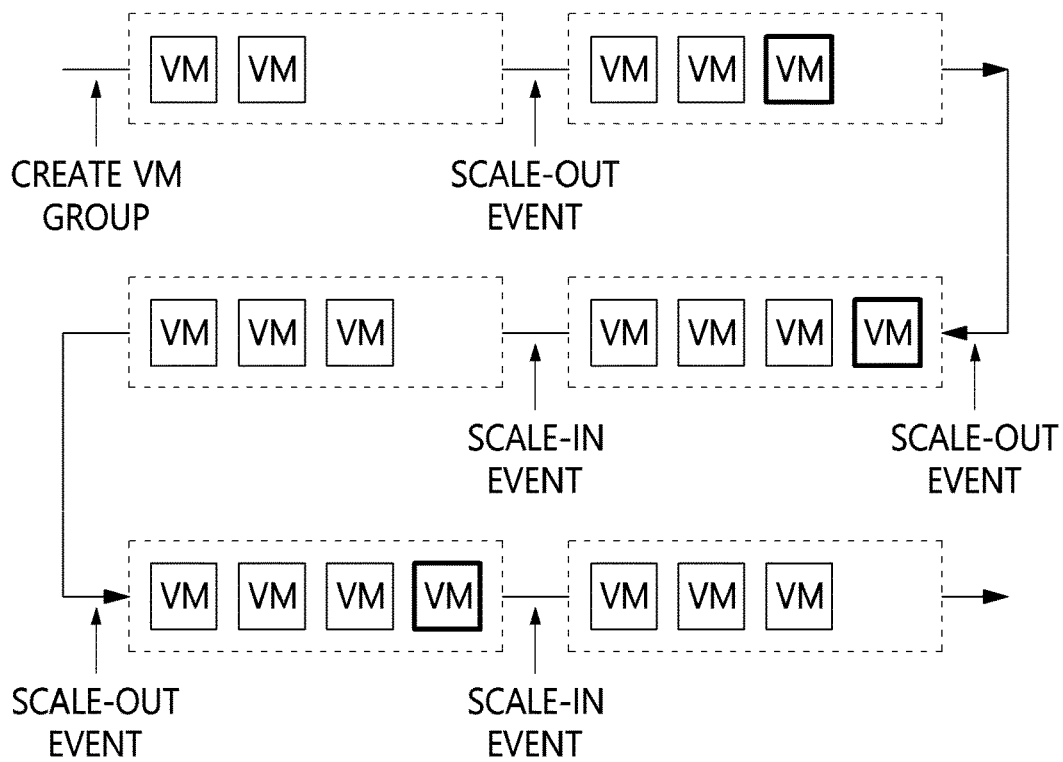
FIG. 3 is an exemplary view illustrating a process for controlling virtual machine scaling.
Figure 4:
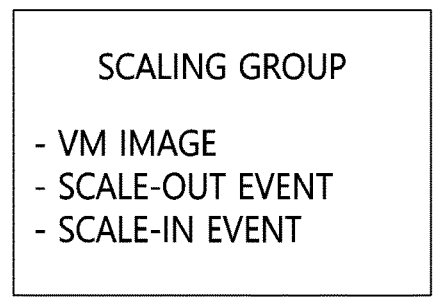
FIG. 4 is an exemplary view of scaling group configuration information.

FIG. 3 is an exemplary view illustrating a process of controlling virtual machine scaling, and FIG. 4 is an exemplary view of scaling group configuration information.

Referring to FIG. 3, a scaling group to be scaled in or out may be set and created.

Referring to FIG. 4, configuration information of a scaling group may include an image for a virtual machine (VM) to be additionally created when a scale-out event occurs, scale-out event condition information, and scale-in event condition information. When a scaling group is set using these conditions, a preset number of virtual machines (VM) created using the corresponding image are run first.

However, in the embodiment, the number of virtual machines (VM) to be run first is not mentioned. Instead, the embodiment is configured such that, when a scale-out event is received by a corresponding scaling group, a virtual machine (VM) is additionally created using the set virtual machine (VM) image, and when a scale-in event is received, the number of virtual machines is decreased by one.

Referring again to FIG. 3, the created virtual machine (VM) group may include multiple virtual machines (VM) created using the image set depending on the scaling group configuration illustrated in FIG. 4.

Subsequently, when an event corresponding to the scale-out event condition or the scale-in event condition illustrated in FIG. 4 occurs, a virtual machine may be added or deleted as illustrated in FIG. 3.

However, in the embodiment, it is required to install a malware detection engine in a virtual machine (VM) and to update the malware detection engine in an environment in which the number of virtual machines (VM) is capable of being automatically increased or decreased in response to a user request, as described above.

In order to support scaling control and an update function using scaling control, it is necessary to set a scaling group and an update group and to provide configuration information required for interworking therebetween.

Particularly, the interworking method is very important in order to support a service that is required to be periodically updated, such as an antimalware service.

In order to simultaneously support virtual machine scaling and update, an update group is set as well as a scaling group at the step of creating an initial scaling group in the embodiment. Also, the scaling group configuration information may further include information other than the information included in FIG. 4.

Figure 5:
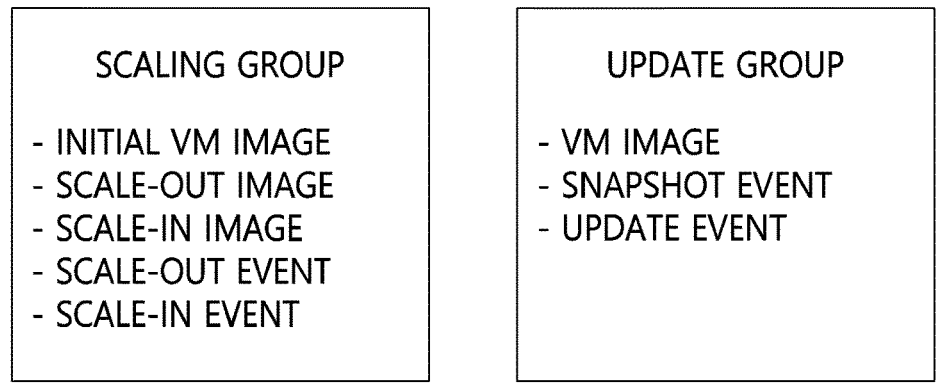
FIG. 5 is an exemplary view of scaling group configuration information and update group configuration information according to an embodiment.

FIG. 5 is an exemplary view of scaling group configuration information and update group configuration information according to an embodiment.

Referring to FIG. 5, a scaling group according to an embodiment may include an initial virtual machine (VM) image, a scale-out image, a scale-in image, scale-out event information, and scale-in event information. That is, comparing this with FIG. 4, the scaling group according to an embodiment is configured to additionally set images to be used for scale-out and scale-in along with a virtual machine (VM) image that is set when a group is created.

Also, an update group according to an embodiment may include a virtual machine (VM) image, a snapshot event, and an update event.

Figure 6:
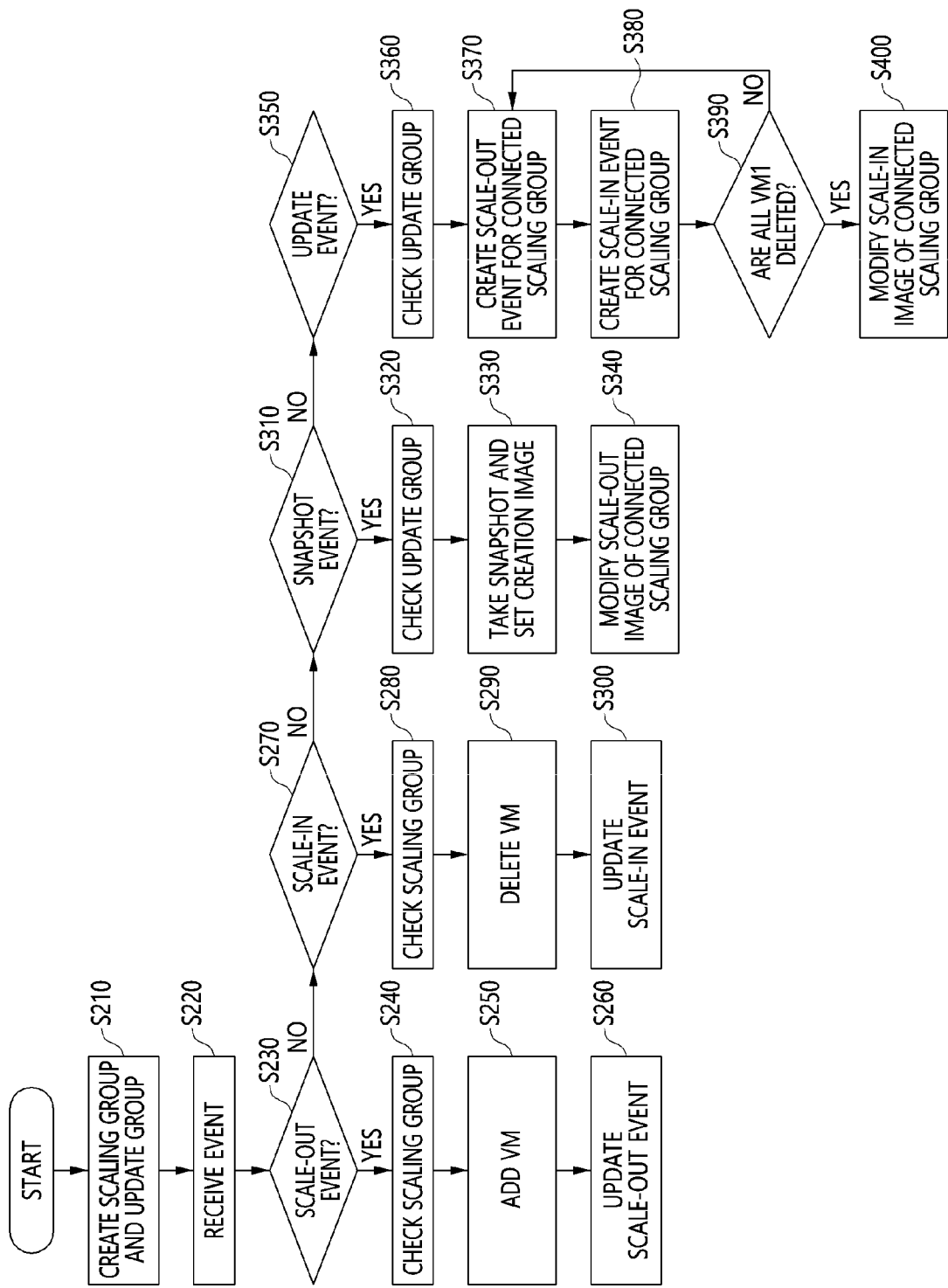
FIG. 6 is a flowchart for explaining a method for updating an Internet-based malware detection engine using virtual machine scaling according to an embodiment.
Figure 7:
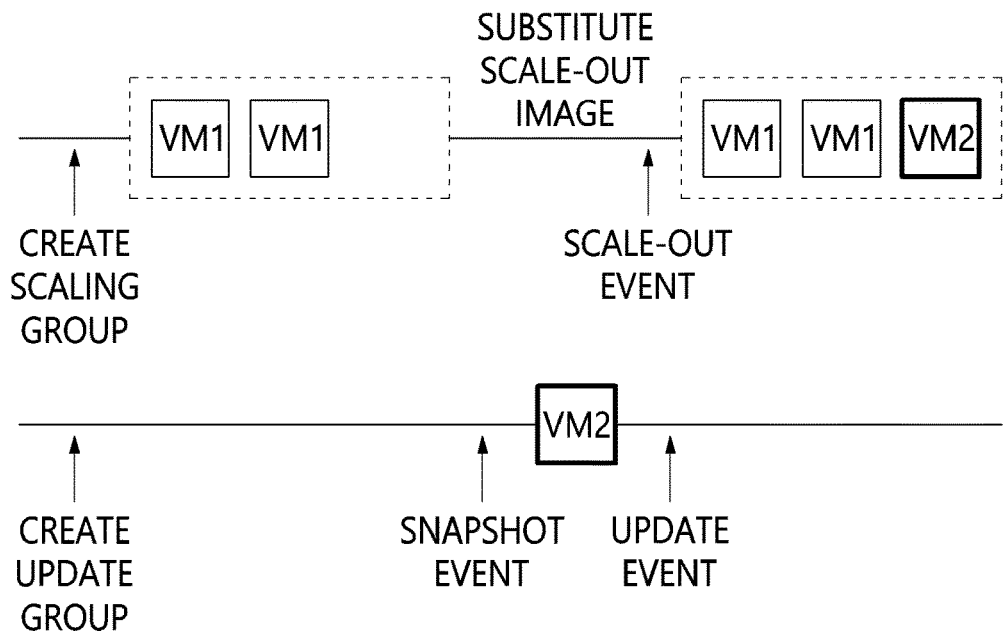
FIG. 7 and FIG. 10 are exemplary views of a process for updating an Internet-based malware detection engine using virtual machine scaling according to an embodiment.
Figure 8:
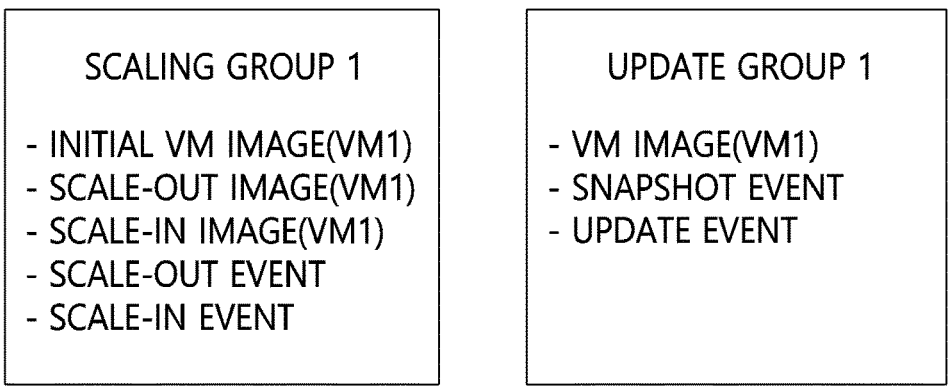
FIG. 8 is an exemplary view of initially created scaling group configuration information and update group configuration information according to an embodiment.
Figure 9:
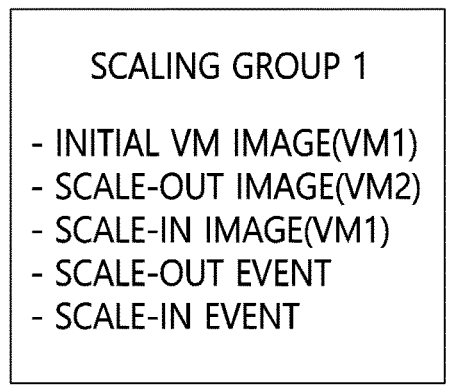
FIG. 9 is an exemplary view of scaling group configuration information in which a scale-out image is substituted according to an embodiment.
Figure 10:
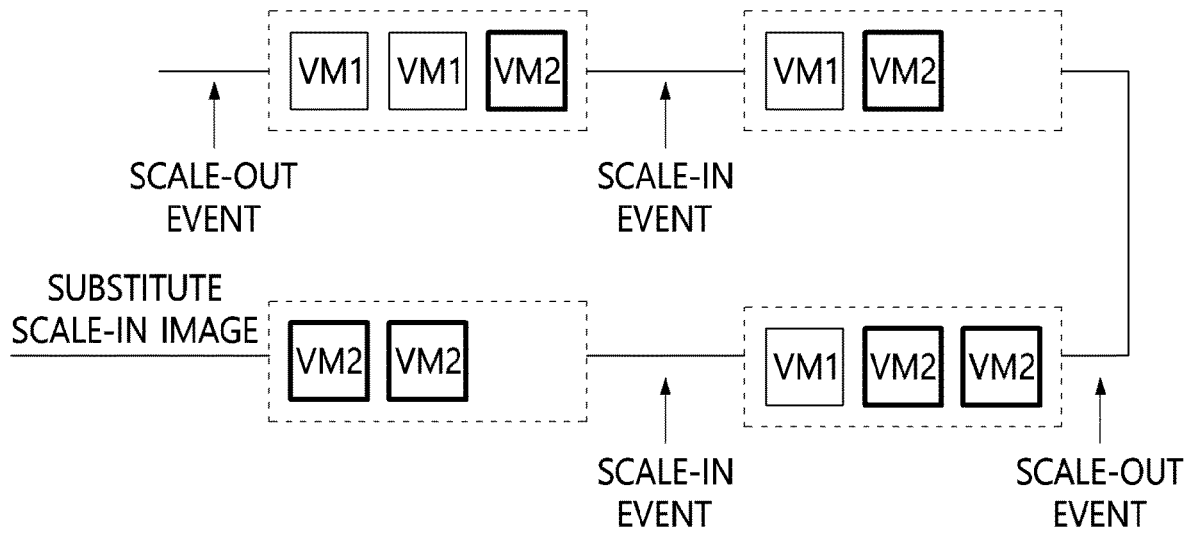
Figure 11:
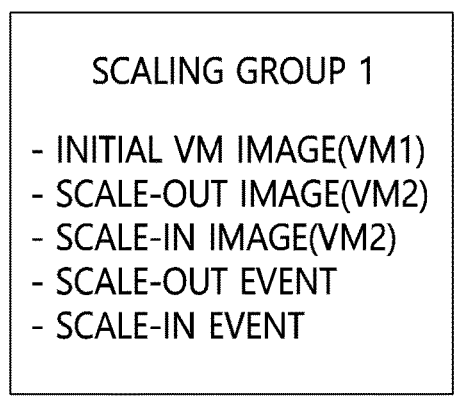
FIG. 11 is an exemplary view of scaling group configuration information in which a scale-in image is substituted according to an embodiment.

FIG. 6 is a flowchart for explaining a method for updating an Internet-based malware detection engine using virtual machine scaling according to an embodiment, FIG. 7 and FIG. 10 are exemplary views of a process for updating an Internet-based malware detection engine using virtual machine scaling according to an embodiment, FIG. 8 is an exemplary view of initially created scaling group configuration information and update group configuration information according to an embodiment, FIG. 9 is an exemplary view of scaling group configuration information in which a scale-out image is substituted according to an embodiment, and FIG. 11 is an exemplary view of scaling group configuration information in which a scale-in image is substituted according to an embodiment.

Referring to FIG. 6, the method for updating an Internet-based malware detection engine using virtual machine scaling according to an embodiment may include creating a scaling group and an update group set based on a first virtual machine (VM1) image at step S210, creating a second virtual machine (VM2) image for a running virtual machine in response to occurrence of a snapshot event in the virtual update group run based on the first virtual machine (VM1) image at steps S310 to S320, modifying the scale-out image of the scaling group to the second virtual machine (VM2) image at step S340, repeatedly triggering a scale-out event and a scale-in event in the scaling group in response to occurrence of an update event at step S340 to S390, and modifying the scale-in image of the scaling group to the second virtual machine (VM2) image at step S400 when all of the virtual machines created using the first virtual machine (VM1) image are deleted from the scaling group.

At step S210 according to an embodiment, scaling group 1 and update group 1 may be created first for scaling and update, as illustrated in FIG. 7.

Here, in scaling group 1, an initial virtual machine (VM) image, a scale-out image, and a scale-in image may be set to the first virtual machine (VM1) image, as illustrated in FIG. 8.

Also, in update group 1, a virtual machine (VM) image may be set to the first virtual machine (VM1) image, as illustrated in FIG. 8.

In the method for updating an Internet-based malware detection engine using virtual machine scaling according to an embodiment, when a scale-out event or a scale-in event occurs before or after an update is performed, a general scale-in/out process may be performed.

That is, referring to FIG. 6, when a scale-out event occurs at step S230, checking the scaling group at step S240, adding a virtual machine (VM) using the scale-out image set in the scaling group at step S250, and updating the scale-out event information at step S260 may be performed.

Also, when a scale-in event occurs at step S270, checking the scaling group at step S280, deleting a virtual machine (VM) of the scale-in image set in the scaling group at step S290, and updating the scale-in event information at step S300 may be performed.

At steps S310 to S330 according to an embodiment, when a snapshot event occurs in the virtual update group run based on the first virtual machine image (VM1), a snapshot is created for the running virtual machine, whereby a second virtual machine (VM2) image, which is a snapshot image, is created, as illustrated in FIG. 7.

Subsequently, at step S340 according to an embodiment, the scale-out image of scaling group 1 may be updated from the first virtual machine (VM1) image to the second virtual machine (VM2) image, as illustrated in FIG. 9.

When creation of the snapshot is completed as described above, update events are sequentially triggered.

That is, at steps S350 to S390 according to an embodiment, a scale-out event and a scale-in event are repeatedly triggered in the scaling group in response to occurrence of an update event, as illustrated in FIG. 7 and FIG. 9.

Here, referring to FIG. 6, when an update event occurs at step S350, checking the scaling group using the value of the first virtual machine (VM1), which is the first image, may be performed at step S360.

Then, in response to occurrence of a scale-out event at step S370, a virtual machine (VM) using the second virtual machine (VM2) image may be added in the scaling group, as illustrated in FIG. 10.

Also, in response to occurrence of a scale-in event at step S380, the virtual machine of the first virtual machine (VM1) image may be deleted from the scaling group, as illustrated in FIG. 10.

Steps S370 and S380 are repeated until all of the virtual machines (VM) of the first virtual machine (VM1) image are deleted, and when all of the virtual machines (VM) of the first virtual machine (VM1) image are completely deleted, it may be determined that the update is completed.

Subsequently, at step S400 according to an embodiment, the scale-in image of scaling group 1 may be updated from the first virtual machine (VM1) image to the second virtual machine (VM2) image, as illustrated in FIG. 11.

Figure 12:
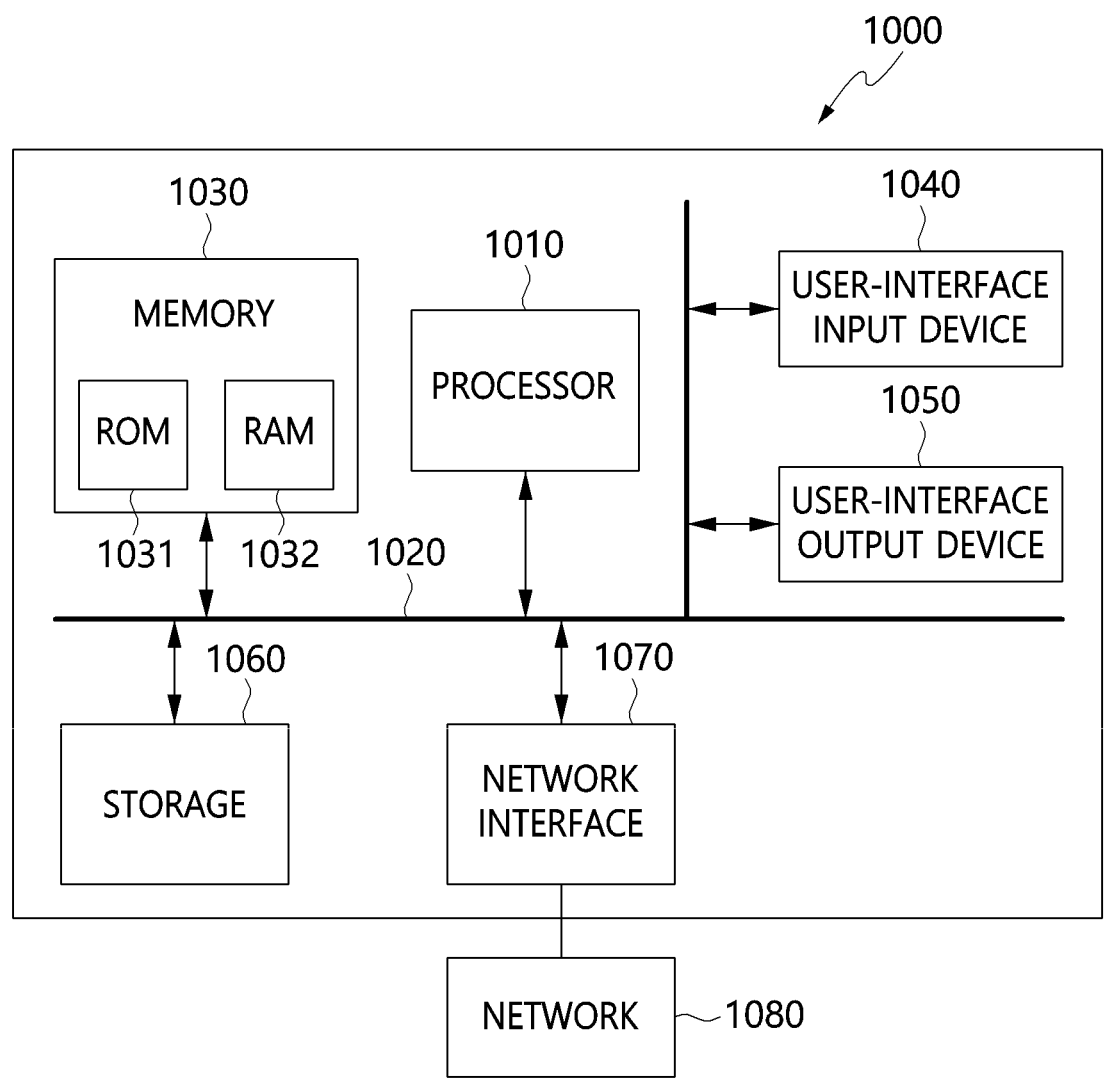
FIG. 12 is a view illustrating a computer system configuration according to an embodiment.

FIG. 12 is a view illustrating a computer system configuration according to an embodiment.

The apparatus for performing the method for updating an Internet-based malware detection engine using virtual machine scaling according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the disclosed embodiment, when a cloud service is supported using a virtual machine, the operation of a malware detection engine may be maintained without interruption even while updated malware information is being reflected.

Although embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. A method for updating an Internet-based malware detection engine using virtual machine scaling, comprising:
    creating a scaling group and an update group set based on a first virtual machine image;
    creating a second virtual machine image for a running virtual machine in response to occurrence of a snapshot event in a virtual update group run based on the first virtual machine image;
    updating a scale-out image of the scaling group to the second virtual machine image;
    updating the scaling group by triggering a scale-out event and a scale-in event in the scaling group in response to occurrence of an update event; and
    updating a scale-in image of the scaling group to the second virtual machine image.

2. The method of claim 1, wherein the scaling group includes an initial virtual machine image, the scale-out image, the scale-in image, scale-out event information, and scale-in event information.

3. The method of claim 1, wherein the update group includes a virtual machine image, a snapshot event, and an update event.

4. The method of claim 3, further comprising:
    checking the scaling group in response to occurrence of the scale-out event;
    adding a virtual machine using the scale-out image set in the scaling group; and
    updating scale-out event information.

5. The method of claim 3, further comprising:
    checking the scaling group in response to occurrence of the scale-in event;
    deleting a virtual machine of the scale-in image set in the scaling group; and
    updating scale-in event information.

6. The method of claim 3, wherein updating the scaling group includes
    adding a virtual machine using the second virtual machine image in the scaling group in response to occurrence of the scale-out event; and
    deleting a virtual machine of the first virtual machine image of the scaling group in response to occurrence of the scale-in event.

7. The method of claim 6, wherein, when updating the scaling group, the scale-out event and the scale-in event are repeatedly triggered until all of virtual machines of the first virtual machine image are deleted.

8. An apparatus for updating an Internet-based malware detection engine using virtual machine scaling, comprising:
    memory in which at least one program is recorded; and
    a processor for executing the program,
    wherein the program performs
    creating a scaling group and an update group set based on a first virtual machine image;
    creating a second virtual machine image for a running virtual machine in response to occurrence of a snapshot event in a virtual update group run based on the first virtual machine image;
    updating a scale-out image of the scaling group to the second virtual machine image;
    updating the scaling group by triggering a scale-out event and a scale-in event in the scaling group in response to occurrence of an update event; and
    updating a scale-in image of the scaling group to the second virtual machine image.

9. The apparatus of claim 8, wherein the scaling group includes an initial virtual machine image, the scale-out image, the scale-in image, scale-out event information, and scale-in event information.

10. The apparatus of claim 8, wherein the update group includes a virtual machine image, a snapshot event, and an update event.

11. The apparatus of claim 10, wherein the program further performs
    checking the scaling group in response to occurrence of the scale-out event;
    adding a virtual machine using the scale-out image set in the scaling group; and
    updating scale-out event information.

12. The apparatus of claim 10, wherein the program further performs
    checking the scaling group in response to occurrence of the scale-in event;

deleting a virtual machine created using the scale-in image set in the scaling group; and updating scale-in event information.

13. The apparatus of claim 10, wherein, when updating the scaling group, the program performs adding a virtual machine using the second virtual machine image in the scaling group in response to occurrence of the scale-out event; and deleting a virtual machine created using the first virtual machine image of the scaling group in response to occurrence of the scale-in event.

14. The apparatus of claim 13, wherein, when updating the scaling group, the program repeatedly triggers the scale-out event and the scale-in event until all of virtual machines created using the first virtual machine image are deleted.

15. An apparatus for updating an Internet-based malware detection engine using virtual machine scaling, comprising:

memory in which at least one program is recorded; and a processor for executing the program, wherein:

the program creates a scaling group and an update group set based on a first virtual machine image and performs at least one of scale-out, scale-in, a snapshot, or an update, or a combination thereof corresponding to an event based on the created scaling group and update group in response to occurrence of the event, the scaling group includes an initial virtual machine image, a scale-out image, a scale-in image, scale-out event information, and scale-in event information, and the update group includes a virtual machine image, a snapshot event, and an update event.

16. The apparatus of claim 15, wherein the program performs checking the scaling group in response to occurrence of a scale-out event;

adding a virtual machine using the scale-out image set in the corresponding scaling group; and updating the scale-out event information.

17. The apparatus of claim 15, wherein the program performs checking the scaling group in response to occurrence of a scale-in event;

deleting a virtual machine created using the scale-in image set in the corresponding scaling group; and updating the scale-in event information.

18. The apparatus of claim 15, wherein the program performs creating a second virtual machine image for a running virtual machine in response to occurrence of the snapshot event in the virtual update group run based on the first virtual machine image; and updating the scale-out image of the scaling group to the second virtual machine image.

19. The apparatus of claim 18, wherein the program performs repeatedly triggering a scale-out event and a scale-in event in the scaling group in response to occurrence of the update event; and updating the scale-in image of the scaling group to the second virtual machine image when all of virtual machines created using the first virtual machine image of the scaling group are deleted.

20. The apparatus of claim 19, wherein the program adds a virtual machine using the second virtual machine image in the scaling group in response to occurrence of the scale-out event and deletes a virtual machine created using the first virtual machine image of the scaling group in response to occurrence of the scale-in event.

* * * * *